United States Patent
Jiao et al.

(10) Patent No.: US 9,354,797 B2
(45) Date of Patent: May 31, 2016

(54) PROGRESS ADJUSTMENT METHOD AND ELECTRONIC DEVICE

(71) Applicant: LENOVO (BEIJING) CO., LTD., Beijing (CN)

(72) Inventors: Zhen Jiao, Beijing (CN); Chao Zhang, Beijing (CN); Chao Dong, Beijing (CN); Xiangyang Li, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 248 days.

(21) Appl. No.: 14/155,246

(22) Filed: Jan. 14, 2014

(65) Prior Publication Data

US 2014/0201633 A1 Jul. 17, 2014

(30) Foreign Application Priority Data

Jan. 14, 2013 (CN) .......................... 2013 1 0012818
Aug. 15, 2013 (CN) .......................... 2013 1 0356892

(51) Int. Cl.
| | | |
|---|---|---|
| G06F 13/00 | (2006.01) | |
| G06F 15/00 | (2006.01) | |
| G06F 3/0484 | (2013.01) | |
| G06F 3/0481 | (2013.01) | |
| G06F 3/0488 | (2013.01) | |
| G06F 3/0485 | (2013.01) | |
| G11B 27/10 | (2006.01) | |
| G11B 27/34 | (2006.01) | |

(52) U.S. Cl.
CPC .......... *G06F 3/04847* (2013.01); *G06F 3/0481* (2013.01); *G06F 3/0488* (2013.01); *G06F 3/04855* (2013.01); *G06F 3/04883* (2013.01); *G11B 27/105* (2013.01); *G11B 27/34* (2013.01)

(58) Field of Classification Search
CPC .......................... G06F 3/04847; G11B 27/105
USPC .......... 715/716, 761–765, 780, 741, 730–732
See application file for complete search history.

(56) References Cited

U.S. PATENT DOCUMENTS

2011/0167347 A1* 7/2011 Joo ...................... G06F 3/04847
                                                         715/716
2014/0023341 A1* 1/2014 Wang ....................... H04N 9/87
                                                         386/240

* cited by examiner

*Primary Examiner* — Kevin Nguyen
(74) *Attorney, Agent, or Firm* — Peter Su; Dentons US LLP

(57) ABSTRACT

The present invention discloses a progress adjustment method and an electronic device, the progress adjustment method is applied to an electronic device including a display unit on which data contents corresponding to first data are output in a chronological order, the method comprising displaying a progress bar corresponding to the first data on the display unit, and unit progress of the progress bar being a first unit progress; when obtaining a first input operation, controlling switching of the data contents of the first data with the first unit progress according to the first input operation; obtaining a second sliding operation; and generating a first sub progress bar based on a current progress unit that includes a progress identifier on the progress bar according to the second sliding operation; unit progress of the first sub progress bar being a second unit progress.

32 Claims, 9 Drawing Sheets

PROGRESS ADJUSTMENT METHOD AND ELECTRONIC DEVICE

CROSS REFERENCE TO RELATED APPLICATIONS

This application claims the benefit under 35 U.S.C. §119 (a) of Chinese Patent Application No. 201310012818.0, filed on Jan. 14, 2013, and Chinese Patent Application No. 201310356892.4, filed on Aug. 15, 2013, the entire disclosures of which are incorporated by reference herein in their entireties.

TECHNICAL FIELD

The present application relates to the field of electronics, and in particular, to a progress adjustment method and an electronic device.

BACKGROUND ART

With the popularity of smart devices, more and more users start watching multimedia, e-books, or the like with mobile phones, tablet computers among the other electronic devices.

In the prior art, for the users to adjust progress of multimedia or e-books being currently enjoyed in the process of enjoying the multimedia or the e-books, a progress bar corresponding to a display unit is displayed on the display unit, a total progress interval of the progress bar corresponds to the data contents (multimedia, e-books) being currently output, for example, the contents being currently output are a movie with a duration of 1 hour and 30 minutes, then a progress bar whose length is 1 hour and 30 minutes is displayed while outputting the movie, thereafter output progress of the contents being currently output is adjusted based on a clicking or a sliding operation of a user on the progress bar.

However, in the process of implementing the technical solutions of embodiments of present application, the inventor of the present application has found that there are at least the following technical problems in the above technique.

Since screens of mobile phones, tablet computers, and the other electronic devices generally are relatively small, the corresponding progress bar is limited, when the data contents that need to be output are relatively long, for example, the video is long, pages of text contents are more, progress span of a unit length on the progress bar is relatively large, then in the prior art, when an operation body moves a small distance or an area covered by the operation body changes slightly, the progress span may be a relatively long time span of the video, like 5 minutes, 10 minutes, and so on, or it may be a so large page span like 5 pages, 10 pages, and so on, the progress adjustment solution in the prior art therefore has a technical problem of low progress adjustment accuracy.

Furthermore, since progress adjustment is performed based on a predetermined progress bar displayed by an electronic device to switch data contents in the prior art, the technical solution in the prior art therefore has a technical problem that the progress adjustment accuracy and the adjustment manner are single.

SUMMARY OF THE INVENTION

Embodiments of the present application, by providing a progress adjustment method and an electronic device, solve the technical problem that accuracy of the progress adjustment is low in the prior art, and thereby achieve the technical effect of performing more accurate adjustment for a predetermined progress interval that needs more accurate progress adjustment on a formed first sub progress bar, thus improving accuracy of the progress adjustment.

In one aspect, an embodiment of the present application provides a progress adjustment method applied to an electronic device including a display unit on which data contents corresponding to first data are output in a chronological order, the method comprising displaying a progress bar corresponding to the first data on the display unit, length of the progress bar being approximately the same as a first side of the display unit, and unit progress of the progress bar being a first unit progress; when obtaining a first input operation, controlling switching of the data contents of the first data with the first unit progress according to the first input operation; obtaining a second sliding operation; and generating a first sub progress bar based on a current progress unit that includes a progress identifier on the progress bar according to the second sliding operation; unit progress of the first sub progress bar being a second unit progress; the second unit progress being smaller than the first unit progress, so that when the electronic device obtains a second input operation on the first sub progress bar, switching of the data contents of the first data is executed with the second unit progress.

In one embodiment, obtaining a first input operation specifically is obtaining a first sliding operation that slides along direction of the progress bar.

In one embodiment, after obtaining a first sliding operation that slides along direction of the progress bar, the method further comprises controlling position of the progress identifier on the progress bar according to the first sliding operation.

In one embodiment, obtaining a second sliding operation specifically is obtaining a second sliding operation that slides in a direction approximately perpendicular to the progress bar.

In one embodiment, after generating a first sub progress bar based on a current progress unit that includes a progress identifier on the progress bar according to the second sliding operation, the method further comprises displaying the first sub progress bar that includes the progress identifier according to the second sliding operation.

In one embodiment, displaying the first sub progress bar that includes the progress identifier according to the second sliding operation specifically is determining, on the progress bar, the current progress unit that includes the progress identifier on the progress bar as a first display length; and geometrically stretching the first display length of the current progress unit according to the sliding direction of the second sliding operation, so as to form the first sub progress bar with a second display length, wherein the second display length and the second unit progress satisfy a correspondence relationship so as to make the progress bar change to a third display length, and the third display length is larger than the first side.

In one embodiment, when the second input operation specifically is a third sliding operation that slides along the direction of the first sub progress bar on the first sub progress bar, after geometrically stretching the first display length of the current progress unit according to the sliding direction of the second sliding operation, so as to form the first sub progress bar with a second display length, the method further comprises controlling position of the progress identifier on the first sub progress bar according to the third sliding operation.

In one embodiment, after controlling position of the progress identifier on the first sub progress bar according to the third sliding operation, the method further comprises detecting whether the third sliding operation ends, so to obtain a detection result; and when the detection result indicates that the third sliding operation ends, controlling the first sub progress bar to gradually reduce to the first display length from the second display length, so as to make the progress bar restore to be approximately the same as the first side from the third display length.

In another aspect, an embodiment of the present application provides an electronic device including a display unit, further comprising a first output unit for outputting data contents corresponding to first data in a chronological order on the display unit, and displaying a progress bar corresponding to the first data on the display unit, length of the progress bar being approximately the same as a first side of the display unit, and unit progress of the progress bar being a first unit progress; a first control unit for, when obtaining a first input operation, controlling switching of the data contents of the first data with the first unit progress according to the first input operation; an obtaining unit for obtaining a second sliding operation; and a generating unit for generating a first sub progress bar based on a current progress unit that includes a progress identifier on the progress bar according to the second sliding operation; unit progress of the first sub progress bar being a second unit progress; the second unit progress being smaller than the first unit progress, so that when the electronic device obtains a second input operation on the first sub progress bar, switching of the data contents of the first data is executed with the second unit progress.

In one embodiment, the first control unit specifically comprises an obtaining subunit for obtaining a first sliding operation that slides along direction of the progress bar.

In one embodiment, the electronic device further comprises a second control unit for controlling position of the progress identifier on the progress bar according to the first sliding operation.

In one embodiment, the obtaining unit specifically is a sliding operation obtaining subunit for obtaining a second sliding operation that slides in a direction approximately perpendicular to the progress bar.

In one embodiment, the electronic device further comprises a second output unit for displaying the first sub progress bar that includes the progress identifier according to the second sliding operation.

In one embodiment, the second output unit specifically is a determining subunit for determining, on the progress bar, the current progress unit that includes the progress identifier on the progress bar as a first display length; and a forming subunit for geometrically stretching the first display length of the current progress unit according to the sliding direction of the second sliding operation, so as to form the first sub progress bar with a second display length, wherein the second display length and the second unit progress satisfy a correspondence relationship so as to make the progress bar change to a third display length, and the third display length is larger than the first side.

In one embodiment, when the second input operation specifically is a third sliding operation that slides along the direction of the first sub progress bar on the first sub progress bar, the electronic device further comprises a third control unit for controlling position of the progress identifier on the first sub progress bar according to the third sliding operation.

In one embodiment, the electronic device further comprises a detecting unit for detecting whether the third sliding operation ends, so as to obtain a detection result; and a third controlling unit for, when the detection result indicates that the third sliding operation ends, controlling the first sub progress bar to gradually reduce to the first display length from the second display length, so as to make the progress bar restore to be approximately the same as the first side from the third display length.

The technical solutions described above in embodiments of the present application at least have the following technical effects or advantages:

Because the technical measures of displaying a progress bar corresponding to the first data on the display unit, length of the progress bar being approximately the same as a first side of the display unit, and unit progress of the progress bar being a first unit progress; when obtaining a first input operation, controlling switching of the data contents of the first data with the first unit progress according to the first input operation; obtaining a second sliding operation; and generating a first sub progress bar based on a current progress unit that includes a progress identifier on the progress bar according to the second sliding operation; unit progress of the first sub progress bar being a second unit progress; the second unit progress being smaller than the first unit progress are adopted, so that when the electronic device obtains a second input operation on the first sub progress bar, switching of the data contents of the first data is executed with the second unit progress. Therefore, the technical problem that accuracy of the progress adjustment is low in the prior art is effectively solved, and thereby the technical effect of performing more accurate adjustment for a predetermined progress interval that needs more accurate progress adjustment on a formed first sub progress bar, thus improving accuracy of the progress adjustment is achieved.

Further, since switching of the data contents of the first data is controlled in accordance with the first unit progress when no first sub progress bar is generated, switching of the data contents of the first data can be controlled in accordance with the second unit progress on the first sub progress bar generated by the second sliding operation, therefore, the technical problem that the progress adjustment accuracy and the adjustment manner are single in the prior art is effectively solved, so rough adjustment and fine adjustment for the progress can be performed on the original progress bar and the generated first sub progress bar respectively, therefore the technical effect of combining rough adjustment and fine adjustment for the progress, and thereby making the progress adjustment more flexible is efficiently achieved.

According to another embodiment of the present application, there is provided a progress adjustment method applied to an electronic device including a sensing unit and a display unit on which, when data contents are displayed, a first progress bar corresponding to the data contents and with a first length value is displayed, the method comprising detecting an input operation by the sensing unit; and in response to the input operation, controlling the first progress bar to form a second progress bar, wherein a first playback duration of the data contents to which a unit length of the first progress bar corresponds is not equal to a second playback duration of the data contents to which a unit length of the second progress bar corresponds.

A more optimized solution, before, in response to the input operation, controlling the first progress bar to form a second progress bar, the method further comprises obtaining first operation information to which the input operation corresponds, and judging whether the first operation information satisfies a first preset condition, so as to obtain a first judgment result; and if the first judgment result indicates that the first operation information satisfies the first preset condition, then controlling the first progress bar to form a second progress bar.

A more optimized solution, when the sensing unit is a touch control unit, then judging whether the first operation information satisfies a first preset condition comprises determining an operation area to which a touch control operation corresponds according to the first operation information, determining whether coordinates of the operation area are within a display area to which the progress bar corresponds, if yes, then determining that the first operation information satisfies the first preset condition.

A more optimized solution, when the sensing unit is a touch control unit, then judging whether the first operation information satisfies a first preset condition comprises obtaining number of touch control points to which the touch control operation corresponds from the first operation information, if it is determined that the number of the touch control points are two, then detecting whether a relative distance between two touch control points is changed, if yes, then determining that the first operation information satisfies the first preset condition.

A more optimized solution, controlling the first progress bar to form a second progress bar comprises acquiring a sliding distance parameter of sliding of the two touch control points in the first operation information, forming a second progress bar with a corresponding length value according to the sliding distance parameter.

A more optimized solution, forming a second progress bar with a corresponding length value according to the sliding distance parameter comprises obtaining a distance value between the two touch control points at a first moment and a second moment when the user performs the touch control operation, the second moment being subsequent to the first moment; and comparing a first distance value between the two touch control points at the first moment with a second distance value between the two touch control points at the second moment, and forming a second progress bar with a second length value according to the comparison result.

A more optimized solution, when the second progress bar is displayed in form of a curve, forming a second progress bar with a second length value according to the comparison result comprises determining a first angle value between a track formed by sliding of the touch control points and a displayed progress bar, if the first angle value is smaller than a predetermined threshold value, and the comparison result is that the first distance value is larger than the second distance value, then determining that the second playback duration is smaller than the first playback duration; when the comparison result is that the first distance value is not larger than the second distance value, then determining that the second playback duration is larger than the first playback duration; and if the first angle value is larger than the predetermined threshold value, and the comparison result is that the first distance value is larger than the second distance value, then determining that the second playback duration is larger than the first playback duration; and when the comparison result is that the first distance value is not larger than the second distance value, then determining that the second playback duration is smaller than the first playback duration.

A more optimized solution, when the first progress bar is displayed in form of a straight line, forming a second progress bar with a second length value according to the comparison result comprises when the comparison result is that the first distance value is larger than the second distance value, then determining that the second playback duration is larger than the first playback duration; and when the comparison result is that the first distance value is not larger than the second distance value, then determining that the second playback duration is smaller than the first playback duration.

A more optimized solution, displaying the second progress bar comprises determining a first display length value of the progress bar when the touch control display unit is displaying a progress bar; determining a first time point of content played at the first moment in the data contents; determining, at the second moment, a second position of the first time point on a first playback progress indicating line according to the second ratio relationship; and cutting off a display line whose length is equal to the first display length value from the second progress bar to display, the display line including the second position.

A more optimized solution, wherein the method further comprises when the sensing unit detects the input operation, determining a first position of a first play time point to which content being displayed currently corresponds on the first progress bar, and determining a third distance value between the first position and a start point of the first progress bar; then after obtaining the second progress bar with a second progress bar, determining a third position on the second progress bar according to the third distance value; and determining a second play time point of the data content to which the third position corresponds according to the second ratio relationship, switching to the second time point to play.

A more optimized solution, the method further comprises when the sensing unit detects an input operation, determining a first play time point to which content being currently displayed corresponds; and then after obtaining the second progress bar with the second length value, determining position of the first play time point on the second progress bar according to the second ratio relationship, and correspondingly displaying the position of the first play time point on the progress bar.

According to another embodiment of the present application, there is provided an electronic device including a sensing unit and a display unit on which, when data contents are displayed, a first progress bar corresponding to the data contents and with a first length value is displayed, wherein the sensing unit detects an input operation, the device further comprising an adjusting unit for, in response to the input operation, controlling the first progress bar to form a second progress bar, wherein a first playback duration of the data contents to which a unit length of the first progress bar corresponds is not equal to a second playback duration of the data contents to which a unit length of the second progress bar corresponds.

A more optimized solution, the electronic device further comprises a judging unit for obtaining first operation information to which the input operation corresponds, and judging whether the first operation information satisfies a first preset condition, so as to obtain a first judgment result; and when the first judgment result indicates that the first operation information satisfies the first preset condition, then it is shifted to the adjusting unit.

More optimal solution, when the sensing unit is a touch control unit, the judging unit comprises a first condition determining module for determining an operation area to which the touch control operation corresponds according to the first operation information, determining whether coordinates of the operation area are within a display area to which the progress bar corresponds, if yes, then determining that the first operation information satisfies the first preset condition; and a second condition determining module for obtaining number of touch control points to which the touch control operation corresponds from the first operation information, if it is determined that the number of the touch control points are two, then detecting whether a relative distance between two touch control points is changed, if yes, then determining that the first operation information satisfies the first preset condition.

A more optimized solution, the adjusting unit is further for acquiring a sliding distance parameter of sliding of the two touch control points in the first operation information, forming a second progress bar with a corresponding length value according to the sliding distance parameter.

A more optimized solution, the adjusting unit is further for obtaining a distance value between the two touch control points at a first moment and a second moment when the user performs the touch control operation, the second moment being subsequent to the first moment; and comparing a first distance value between the two touch control points at the first moment with a second distance value between the two touch control points at the second moment, and forming the second progress bar with the second length value according to the comparison result.

One or more technical solutions of embodiments of the present application described above have at least the following technical effects:

The method provided by the present application can directly adjust a ratio relationship between a progress indicating lines displayed on a touch control bar and play time of the data contents by means of a preset touch control operation. If a user needs to improve accuracy of the progress adjustment, he/she can directly extend the playback progress indicating line, after the playback progress indicating line is extended, play time to which each scale corresponds is shortened, then the user can adjust to a position where he/she wants to watch more accurately and easily when using the extended playback progress indicating line. In addition, accuracy, which is several times that of the conventional progress bar, can be reached easily. Because the correspondence relationship between the progress bar and play time provided by the present application is adjustable, the user can arbitrarily adjust accuracy of the progress bar according to his/her own requirements on accuracy, and the adjustment operation in the present application only requires the user to input a touch control operation that satisfies a preset condition, the operation procedure is simple and natural.

BRIEF DESCRIPTION TO THE DRAWINGS

DETAILED DESCRIPTION

Embodiments of the present application, by providing a progress adjustment method and an electronic device, solve the technical problem that accuracy of the progress adjustment is low in the prior art, and thereby achieve the technical effect of performing more accurate adjustment for a predetermined progress interval that needs more accurate progress adjustment on a formed first sub progress bar, thus improving accuracy of the progress adjustment.

First Embodiment

In order to solve the technical problem that accuracy of the progress adjustment is low, technical solutions in embodiments of the present application have the general concept as follows:

Displaying a progress bar corresponding to the first data on the display unit, length of the progress bar being approximately the same as a first side of the display unit, and unit progress of the progress bar being a first unit progress; when obtaining a first input operation, controlling switching of the data contents of the first data with the first unit progress according to the first input operation; obtaining a second sliding operation; and generating a first sub progress bar based on a current progress unit that includes a progress identifier on the progress bar according to the second sliding operation; unit progress of the first sub progress bar being a second unit progress; the second unit progress being smaller than the first unit progress, so that when the electronic device obtains a second input operation on the first sub progress bar, switching of the data contents of the first data is executed with the second unit progress.

By means of generating a first sub progress bar according to a sliding operation, and thereafter unit progress of the first sub progress bar being smaller than that of the original progress bar as described above, as for a sliding operation of the same distance on the display unit, the progress adjustment on the first sub progress bar is more accurate, which solves the technical problem that accuracy of the progress adjustment is low in the prior art, and thereby achieves the technical effect of performing more accurate adjustment for a predetermined progress interval that needs more accurate progress adjustment on a formed first sub progress bar, thus improving accuracy of the progress adjustment.

To better understand the above technical solution, the technical solution will be described in detail in conjunction with the accompanying drawings and the specific implementing modes below.

The present application provides a progress adjustment method applied to an electronic device via an embodiment thereof, the electronic device is a smart phone, a feature phone, a tablet computer, and so on. The electronic device includes a display unit on which data contents corresponding to first data are output in a chronological order.

Figure 1:
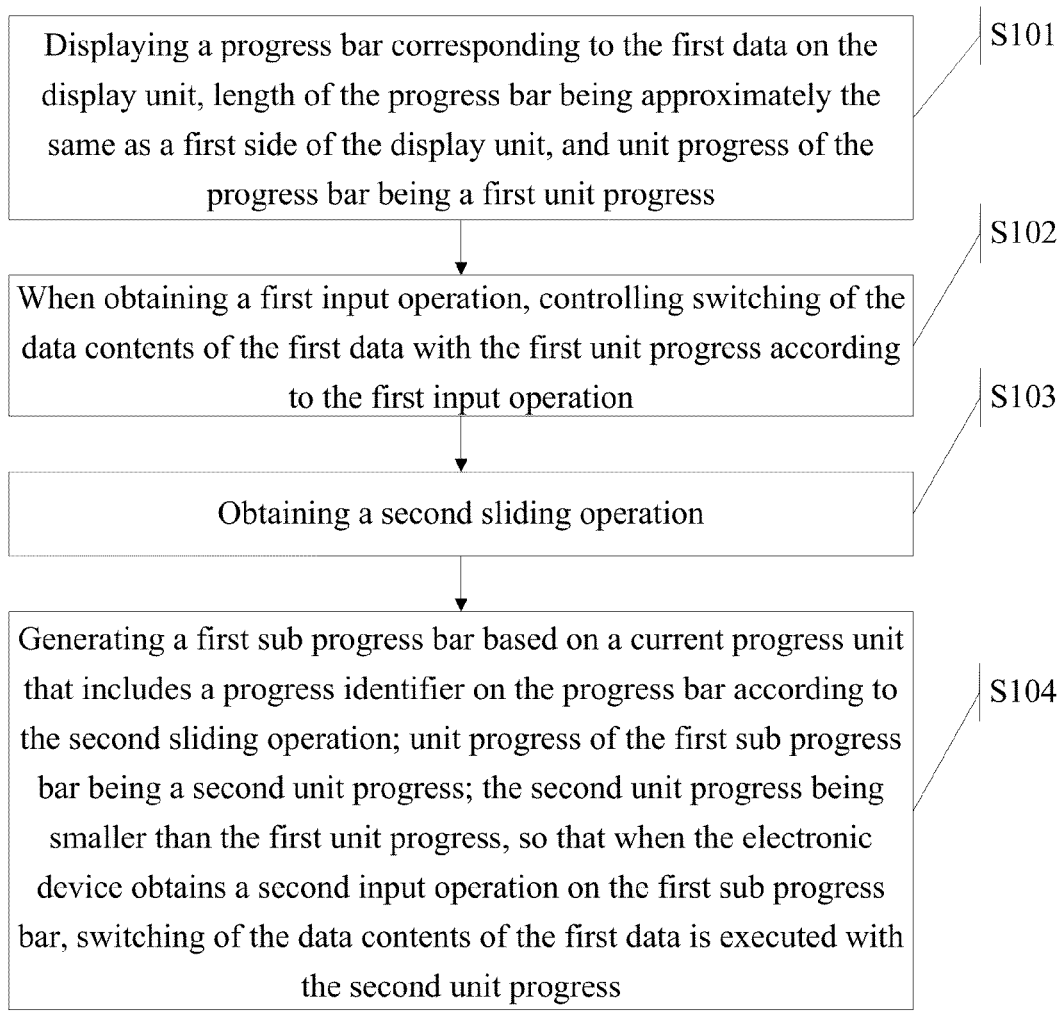
FIG. 1 is a flowchart of the progress adjustment method in an embodiment of the present application.

As shown in FIG. 1, the method comprises the following steps:

S101: displaying a progress bar corresponding to the first data on the display unit, length of the progress bar being approximately the same as a first side of the display unit, and unit progress of the progress bar being a first unit progress;

S102: when obtaining a first input operation, controlling switching of the data contents of the first data with the first unit progress according to the first input operation;

S103: obtaining a second sliding operation;

S104: generating a first sub progress bar based on a current progress unit that includes a progress identifier on the progress bar according to the second sliding operation; unit progress of the first sub progress bar being a second unit progress; the second unit progress being smaller than the first unit progress, so that when the electronic device obtains a second input operation on the first sub progress bar, switching of the data contents of the first data is executed with the second unit progress.

Hereinafter, taking the electronic device as a smart phone for example, the technical solution of the present application will be described in detail in conjunction with FIG. 1.

The first data output in a chronological order on the display unit may specifically be audio and video files, such as movies, TV shows, sounds etc., the first data may also be text contents, such as e-books, word files, PDF files etc. When any type of the first data is output in a chronological order on the display unit, step S101 is executed, that is, displaying a progress bar corresponding to the first data on the display unit, length of the progress bar being approximately the same as a first side of the display unit, the first side may be a long side or a short side of the display unit, specifically, when the electronic device outputs the first data with a horizontal screen, length of the progress bar is approximately the same as the long side of the display unit, and when the electronic device outputs the first data with a vertical screen, length of the progress bar is approximately the same as the short side of the display unit.

Moreover, unit progress of the progress bar is a first unit progress, specifically, the first unit progress of the progress bar is determined based on length of the first side of the electronic device and a total progress interval of the displayed first data. For example, a long side of the current electronic device is 10 cm, a short side thereof is 5 cm, when a video file with a duration of 1 hour 30 minutes is output in manner of a horizontal screen, a total progress interval of the progress bar is 1 hour 30 minutes, then the corresponding first unit progress is 9 minutes/1 cm; when a video file with a duration of 1 hour 30 minutes is output in manner of a vertical screen, a total progress interval of the progress bar is 1 hour and 30 minutes, the corresponding first unit progress is 18 minutes/1 cm. Again for example, an e-book with a total page number of 100 pages is output in manner of a vertical screen, then a total number of pages of the progress bar is 100, the first progress unit is 20 pages/1 cm.

After step S101 is executed, step S102 is executed successively, that is, when obtaining a first input operation, controlling switching of the data contents of the first data with the first unit progress according to the first input operation.

In a specific implementation, the first input operation may be a clicking operation on the progress bar, position of a progress identifier on the progress bar is determined through the clicking operation, to directly switch to the data content at the position where the clicking operation resides. The first input operation may also be a first sliding operation that slides along direction of the progress bar, position of a progress identifier on the progress bar is determined through the first sliding operation, to achieve the control on the continuous switching of the first data with the first unit progress.

When the user performs a second sliding operation, step S103 is executed, that is, obtaining a second sliding operation. The second sliding operation may specifically is a sliding operation that slides upward in a direction approximately perpendicular to the progress bar as executed subsequent to the first sliding operation.

When a second sliding operation that slides upward in a direction approximately perpendicular to the progress bar is obtained in step S103, step S104 is executed successively, that is, generating a first sub progress bar based on a current progress unit that includes a progress identifier on the progress bar according to the second sliding operation.

Specifically, progress unit is a partial progress bar with a predetermined length on a progress bar. A complete progress bar may be evenly divided into X equal portions according to a predetermined rule, so as to form X equal progress units, one progress unit corresponds to partial data contents of the first data. For example, a progress bar has a length of 10 cm, the predetermined rule is evenly dividing the progress bar into 10 portions, then the progress bar is evenly divided into 10 progress units, one progress unit is 1 cm, and when the first data output is a video with a duration of 90 minutes, a first 1 cm progress unit corresponds to image frames at 0 to 9 minutes, a second 1 cm progress unit corresponds to image frames at 9 to 18 minutes, and data contents to which the third to tenth progress units respectively correspond can be determined in order.

A current progress unit is determined based on a start touch control position of the second sliding operation on the display unit. After determining the current progress unit, length of the first sub progress bar to be generated is determined based on a sliding distance of the second sliding operation, to generate the first sub progress bar. Thereafter, a second unit progress is determined based on the length of the first sub progress bar and data contents of the current progress unit.

For example, taking the current progress unit being the second 1 cm progress unit as example, step S104 is illustrated as example, but not used to limit the present application.

When the second sliding operation is a sliding operation that slides upward in a direction approximately perpendicular from the position of the second progress unit to a position of M cm, length of the first sub progress bar is determined based on a sliding distance of the second sliding operation and a length of the second unit progress, so as to generate the first sub progress bar. Assuming that length of the generated first sub progress bar is 9 cm, and it corresponds to image frames at 9 minutes to 18 minutes of the first data, then the first unit progress is 9 minutes/1 cm, the second unit progress is 1 minute/1 cm, thus the obtained second unit progress is smaller than the first unit progress, so that when a third input operation is obtained on the first sub progress bar, data contents are switched with a smaller unit progress.

After the first sub progress bar is generated based on step S104, the following step is executed successively displaying the first sub progress bar that includes the progress identifier according to the second sliding operation.

Specifically, the first sub progress bar is displayed by the following implementing mode: first, determining, on the progress bar, the current progress unit that includes the progress identifier on the progress bar as a first display length; thereafter, geometrically stretching the first display length of the current progress unit according to the sliding direction of the second sliding operation, so as to form the first sub progress bar with a second display length, wherein the second display length and the second unit progress satisfy a correspondence relationship so as to make the progress bar change to a third display length, and the third display length is larger than the first side.

For example, when the first display length of the progress unit currently determined is 1 cm, the second sliding operation is sliding upward 3 cm in a direction approximately perpendicular to the progress bar, then the current progress unit of the first display length is stretched geometrically, so that the second display length of the formed first sub progress bar is approximately 7 cm, when the second sliding operation continuously slides upward 5 cm in a direction approximately perpendicular to the progress bar, the current progress unit is stretched geometrically continuously, the second display length of the formed first sub progress bar is approximately 10 cm, thus in a specific application process, the farther the sliding distance of the second sliding operation is, the larger the second display length is, the smaller the second progress unit is, and the more accurate the progress adjustment is.

Specifically, generation of the first sub progress bar comprises that the progress bar length of the first sub progress bar changes from a length approximately the same as the first side of the display unit to a third display length.

Further, after the first sub progress bar is displayed, the following step is further comprised controlling position of the progress identifier on the first sub progress bar according to the third sliding operation. Specifically, the third sliding operation, as the sliding operation that slides along the direction of the first sub progress bar, enables to control the continuous switching of the data contents of the first data with the second unit progress.

Further, in a specific implementation, after controlling position of the progress identifier on the first sub progress bar according to the third sliding operation, the following step is further comprised detecting whether the third sliding operation ends, so to obtain a detection result. Specifically, when the display unit is a touch control display unit, when it is detected that an operating body is apart from the touch control display unit, it indicates that the third sliding operation ends, the first sub progress bar is controlled to gradually reduce to the first display length from the second display length, then the first sub progress bar disappears, so as to make the progress bar restore to be approximately the same as the first side from the third display length.

Assuming that a user Xiao Wang is using a 9*3 smart phone to play a move "Alien" with a playback duration of 180 minutes, but Xiao Wang wants to watch the scene when alien appears at "57:38".

The technical solution of the embodiment of the present application is described below with the above assumption as example.

Figure 2:
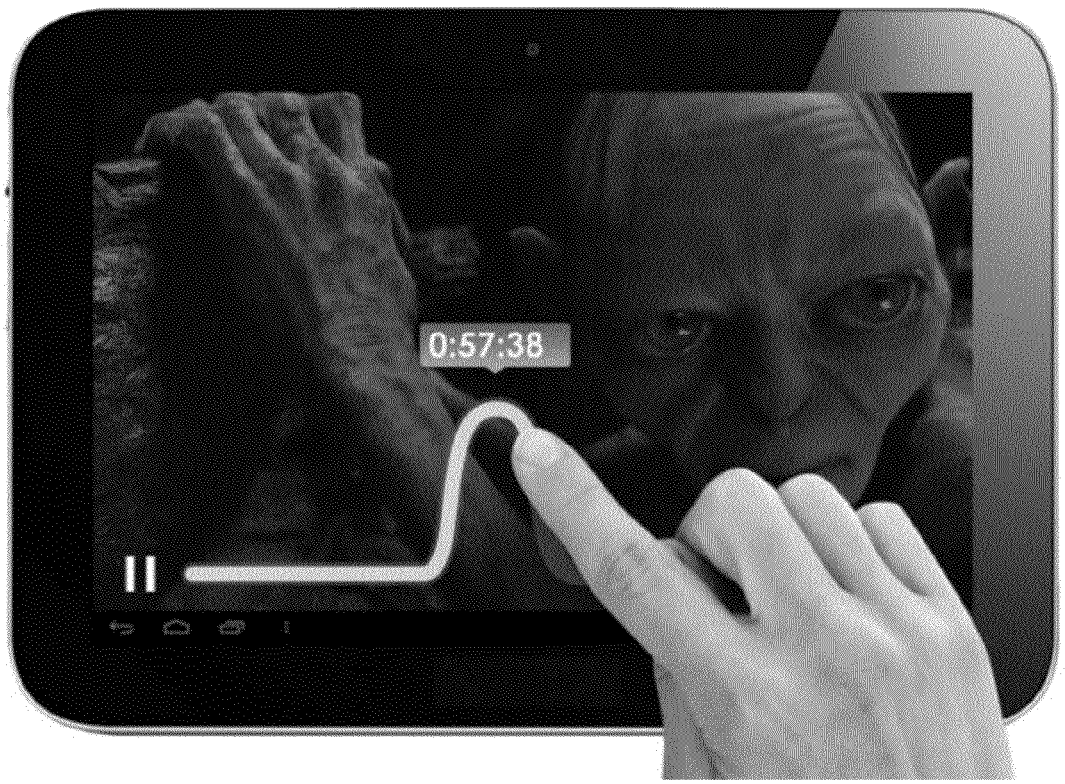
FIG. 2 is a schematic diagram of performing an operation based on the first sub progress bar in the embodiment of the present application.

A progress bar of 9 cm corresponding to the duration of "aliens" is displayed; the first unit progress of the progress bar is 18 minutes/1 cm. First, the user performs a first sliding operation rightward along the progress bar at a start "0:0" of the progress bar, then the electronic device controls switching of contents of the movie with the first unit progress of 20 minutes/1 cm. When sliding to 56 minutes along the progress bar, a progress identifier is displayed at the position of 56 minutes, at this time Xiao Wang changes the sliding direction, and performs a second sliding operation upward in a direction approximately perpendicular to the progress bar, then when the smart phone detects the second sliding operation upward in a direction approximately perpendicular to the progress bar, it determines based on the start position of second sliding operation on the progress bar that the current progress unit is the third 1 cm to which the 40 minutes to 60 minutes correspond. Then a first sub progress bar is generated based on the third 1 cm with the progress identifier, when the second sliding operation is sliding upward 1 cm approximately perpendicular to the progress bar, it is determined that the display length of the current progress unit is 1 cm, the first sub progress bar of 3.2 cm is generated based on the current progress unit and the second sliding operation. Thereafter, the current progress unit is stretched geometrically according to the sliding direction of the second sliding operation, stretching from 1 cm to 3.2 cm, then the display length of the first sub progress bar is 3.2 cm, and then direction of the sliding operation is changed on the displayed first sub progress bar, so as to execute a third sliding operation along the sub progress bar on the sub progress bar, and control the continuous switching of contents of the movie with the second unit progress of 6.25 minutes/1 cm, as shown in FIG. 2, it is easy to adjust to "57:38". After adjusting to "57:38", Xiao Wang's finger is apart from the screen, and then the first sub progress bar disappears.

Based on the same inventive concept, the present application provides an electronic device via another embodiment thereof, the electronic device includes a display unit, the electronic device may be a smart phone, a feature phone, a tablet computer etc.

Figure 3:
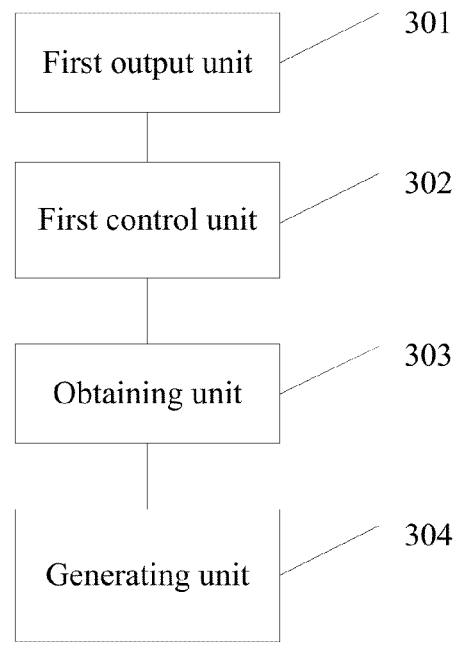
FIG. 3 is a structural schematic diagram of an electronic device in an embodiment of the present application.

As shown in FIG. 3, the electronic device comprises the following architecture a first output unit 301 for outputting data contents corresponding to first data in a chronological order on the display unit, and displaying a progress bar corresponding to the first data on the display unit, length of the progress bar being approximately the same as a first side of the display unit, and unit progress of the progress bar being a first unit progress; a first control unit 302 for, when obtaining a first input operation, controlling switching of the data contents of the first data with the first unit progress according to the first input operation; an obtaining unit 303 for obtaining a second sliding operation; and a generating unit 304 for generating a first sub progress bar based on a current progress unit that includes a progress identifier on the progress bar according to the second sliding operation; unit progress of the first sub progress bar being a second unit progress; the second unit progress being smaller than the first unit progress, so that when the electronic device obtains a second input operation on the first sub progress bar, switching of the data contents of the first data is executed with the second unit progress.

Further, in a specific implementation, the first control unit 302 specifically comprises an obtaining subunit for obtaining a first sliding operation that slides along direction of the progress bar.

Further, in a specific implementation, the electronic device further comprises a second control unit for controlling position of the progress identifier on the progress bar according to the first sliding operation.

Further, in a specific implementation, the obtaining unit 303 specifically is a sliding operation obtaining subunit for obtaining a second sliding operation that slides in a direction approximately perpendicular to the progress bar.

Further, in a specific implementation, the electronic device further comprises a second output unit for displaying the first sub progress bar that includes the progress identifier according to the second sliding operation.

Further, in a specific implementation, the second output unit comprises a determining subunit for determining, on the progress bar, the current progress unit that includes the progress identifier on the progress bar as a first display length; and a forming subunit for geometrically stretching the first display length of the current progress unit according to the sliding direction of the second sliding operation, so as to form the first sub progress bar with a second display length, wherein the second display length and the second unit progress satisfy a correspondence relationship so as to make the progress bar change to a third display length, and the third display length is larger than the first side.

Further, in a specific implementation, when the second input operation specifically is a third sliding operation that slides along the direction of the first sub progress bar on the first sub progress bar, the electronic device further comprises a third control unit for controlling position of the progress identifier on the first sub progress bar according to the third sliding operation.

Further, in a specific implementation, the electronic device further comprises a detecting unit for detecting whether the third sliding operation ends, so to obtain a detection result; and a third controlling unit for, when the detection result indicates that the third sliding operation ends, controlling the first sub progress bar to gradually reduce to the first display length from the second display length, so as to make the progress bar restore to be approximately the same as the first side from the third display length.

The electronic device in this embodiment and the progress adjustment method described above are two aspects based on the same inventive concept, since implementation of the method has been described in detail in the above, a person skilled in the art can be clearly understand the structure and implementation of the electronic device according to the above description, for brevity of the specification, no more details are repeated herein.

The technical solutions described above in embodiments of the present application at least have the following technical effects or advantages:

Because the technical measures of displaying a progress bar corresponding to the first data on the display unit, length of the progress bar being approximately the same as a first side of the display unit, and unit progress of the progress bar being a first unit progress; when obtaining a first input operation, controlling switching of the data contents of the first data with the first unit progress according to the first input operation; obtaining a second sliding operation; and generating a first sub progress bar based on a current progress unit that includes a progress identifier on the progress bar according to the second sliding operation; unit progress of the first sub progress bar being a second unit progress; the second unit progress being smaller than the first unit progress are adopted, so that when the electronic device obtains a second input operation on the first sub progress bar, switching of the data contents of the first data is executed with the second unit progress. Therefore, the technical problem that accuracy of the progress adjustment is low in the prior art is effectively solved, and thereby the technical effect of performing more accurate adjustment for a predetermined progress interval that needs more accurate progress adjustment on a formed first sub progress bar, thus improving accuracy of the progress adjustment is achieved.

Further, since switching of the data contents of the first data is controlled in accordance with the first unit progress when no first sub progress bar is generated, switching of the data contents of the first data can be controlled in accordance with the second unit progress on the first sub progress bar generated by the second sliding operation, therefore, the technical problem that the progress adjustment accuracy and the adjustment manner are single in the prior art is effectively solved, so rough adjustment and fine adjustment for the progress can be performed on the original progress bar and the generated first sub progress bar respectively, therefore the technical effect of combining rough adjustment and fine adjustment for the progress, and thereby making the progress adjustment more flexible is efficiently achieved.

Second Embodiment

In addition, because audio and video player interfaces provided on the conventional mobile digital devices having touch control screens most continue to use the interfaces on personal computers in the past, however, since a mouse click is more accurate than a finger touch, after operation interfaces designed for the mouse on the personal computers in the past are continuously used on the touch control screens devices, it results in that a lot of controls in the touch control devices can not achieve the original using effect. Especially when users need to adjust the playback progress of audio and video files, the corresponding adjustment usually is performed on a progress bar displayed on a display unit in the prior art, however, since areas of the display units of the mobile electronic devices are limited, and a finger touch operation touches a larger area relative to a cursor of the mouse, so it is not so easy to control the progress when controlling the progress bar by the finger, so when the users adjust the playback progress of the audio and video files via the progress bar as provided by the solution in the prior art, the adjustment technique provided by the conventional touch control screens often cannot meet the users' adjustment accuracy requirement.

In view of the above problem, the present application provides a progress adjustment method applied to an electronic device including a sensing unit and a display unit on which, when data contents are displayed, a first progress bar corresponding to the data contents and with a first length value is displayed, the method comprising: detecting an input operation by the sensing unit; and in response to the input operation, controlling the first progress bar to form a second progress bar, wherein a first playback duration of the data contents to which a unit length of the first progress bar corresponds is not equal to a second playback duration of the data contents to which a unit length of the second progress bar corresponds.

The method provided by the present application can directly adjust a ratio relationship between a progress indicating lines displayed on a touch control bar and play time of the data contents by means of a preset touch control operation. If a user needs to improve accuracy of the progress adjustment, he/she can directly extend the playback progress indicating line, after the playback progress indicating line is extended, play time to which each scale corresponds is shortened, then the user can adjust to a position where he/she wants to watch more accurately and easily when using the extended playback progress indicating line. In addition, accuracy, which is several times that of the conventional progress bar, can be reached easily. Because the correspondence relationship between the progress bar and play time provided by the present application is adjustable, the user can arbitrarily adjust accuracy of the progress bar according to his/her own requirements on accuracy, and the adjustment operation in the present application only requires the user to input a touch control operation that satisfies a preset condition, the operation procedure is simple and natural.

In addition, since the solution provided by the present application does not need to add extra controls, not only a very fine control granularity is ensured, but also an approximate position where a current process locates can be reflected very intuitively.

Hereinafter, primary implementation principles, specific implementing modes, and corresponding beneficial effects that can be achieved of the technical solution of the present application will be described in detail in conjunction with the accompany drawings.

Figure 4:
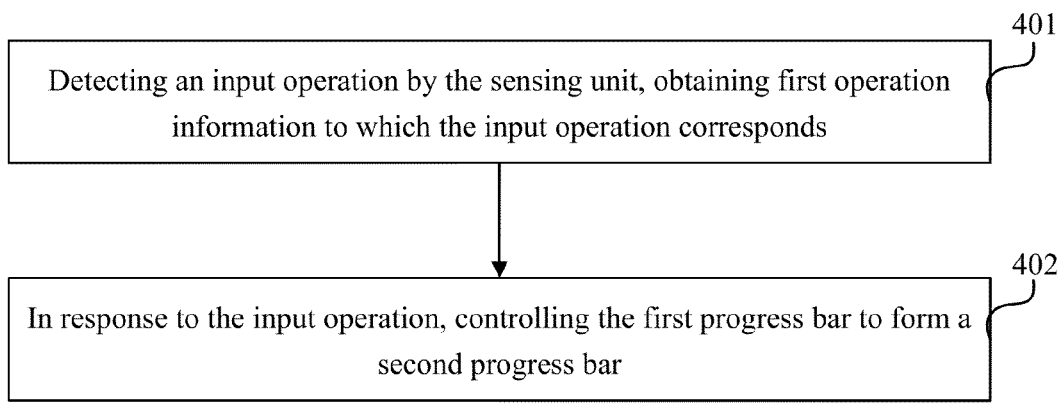
FIG. 4 is a flowchart of a method for controlling video playback contents in an embodiment of the present application.

As shown in FIG. 4, an embodiment of the present application provides a process adjustment method; the specific implementing modes of the present application will be described below in detail in conjunction with the drawings attached to the specification.

The method provided by the present application is applied to an electronic device including a sensing unit and a display unit.

In order to facilitate the user adjusting the playback progress of data contents based on his/her own watching needs, usually a progress bar corresponding to the data contents will be displayed correspondingly when playing the data contents, and a total playback duration of the data contents and a time point of the content being currently displayed among the entirety of the data contents is displayed on this progress bar. Therefore, when the electronic device plays any data contents, a first progress bar corresponding to the data contents and with a first length value is displayed on the display unit, the method specifically comprises:

In step 401, detecting an input operation by the sensing unit;

In an embodiment of the present application, the sensing unit may be a control unit, or a space gesture detection unit, or a close contact unit etc.

In step 402, in response to the input operation, controlling the first progress bar to form a second progress bar, wherein a first playback duration of the data contents to which a unit length of the first progress bar corresponds is not equal to a second playback duration of the data contents to which a unit length of the second progress bar corresponds.

In order to avoid setting an additional control, whether the user needs to adjust the correspondence relationship of the progress bar and the play time of the data contents is determined by presetting a touch control operation in the present application.

In an embodiment of the present application, when the progress bar is adjusted through the input operation, a portion of the progress bar may be adjusted correspondingly, or a ratio relationship between the entirety of the progress bar and the playback duration of the data contents may be also adjusted.

In the case of partial adjustment, the specific implementation may be when the user performs adjustment through the input operation, a first area on the progress bar to which the input operation corresponds is determined, and thereafter a first play time of the data contents to which the first area corresponds is determined.

Then the first area is stretched or compressed to form a second progress bar, so that the second progress bar corresponds to the first play time. When the second progress bar is stretched, duration to which a unit length of the second progress bar corresponds in the first play time becomes shorter or longer otherwise.

In an embodiment of the present application, in order to further determine whether the detected input operation is an operation to adjust accuracy of the progress bar, the input operation needs to be judged, the specific steps comprise obtaining first operation information to which the input operation corresponds, and judging whether the first operation information satisfies a first preset condition, so as to obtain a first judgment result; and if the first judgment result indicates that the first operation information satisfies the first preset condition, then controlling the first progress bar to form a second progress bar.

In an embodiment of the present application, since the adjustment to accuracy of the playback progress is achieved without adding an additional control, so it is necessary to obtain an adjustment parameter for the user to perform accuracy adjustment from the first operation information input by the user, so as to make the electronic device make corresponding accuracy adjustment according to the adjustment parameter input by the user.

Figure 5:
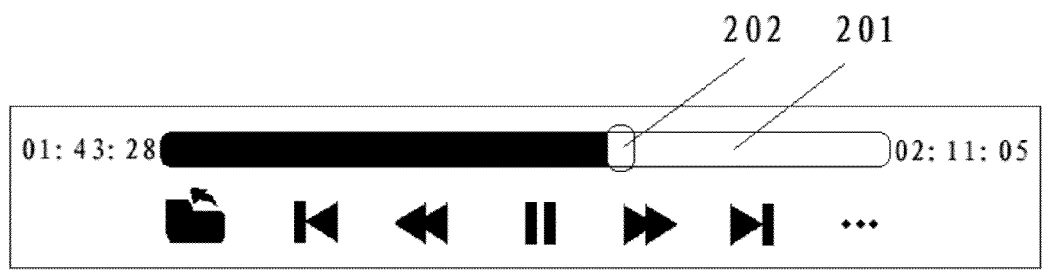
FIG. 5 is a simplified schematic diagram of the display interface of the progress bar in the prior art.

Among most of the conventional players, the used progress bar display interface is as shown in FIG. 5, wherein a playback progress indicating line 201 is used to indicate a playback duration to which the data contents that are currently played correspond, a slider 202 is used to indicate a time point to which the data content being currently played in the data contents that are played.

In an embodiment of the present application, the method for determining whether the first operation information input by the user is to trigger the electronic device to perform accuracy adjustment may include a variety, when the sensing unit is a touch control unit, the embodiment of the present application provides the following two optimized implementation solutions, which specifically are:

(1) Whether the user needs to adjust the accuracy of the progress bar may be judged by detecting whether the touch control operation performed by the user is at a position where the progress bar is displayed in the touch control display unit, if the first touch control operation is executed within the display area of the progress bar, it can be determined that the first touch control operation performed by the user currently requires to perform adjustment on the progress bar, thus judging whether the first operation information satisfies the first preset condition may be determining an operation area to which a touch control operation corresponds according to the first operation information, determining whether coordinates of the operation area are within a display area to which the progress bar corresponds, if yes, then determining that the first operation information satisfies the first preset condition.

Figure 6:
FIG. 6 is a schematic diagram of the display interface when the progress bar and the display contents are displayed together in prior art.

Like the display interface as shown in FIG. 6, wherein the display area to which the progress bar corresponds is a block area A, if the user performs the first touch control operation in the area A, then it is determined that the user needs to adjust accuracy of the progress bar.

(2) Also, a specific touch control operation may be defined in advance as a template operation to trigger progress adjustment, no matter the area where the user performs the specific operation is within the display area of the progress bar or not, it can be all determined that the user needs to adjust accuracy of the progress bar. The specific implementation of this embodiment comprises obtaining number of touch control points to which the touch control operation corresponds from the first operation information, if it is determined that the number of the touch control points are two, then detecting whether a relative distance between two touch control points is changed, if yes, then determining that the first operation information satisfies the first preset condition.

Figure 7:
FIG. 7 is a schematic diagram of the playback progress indicating line as abstracted from the progress bar in the embodiment of the present application.
Figure 8:
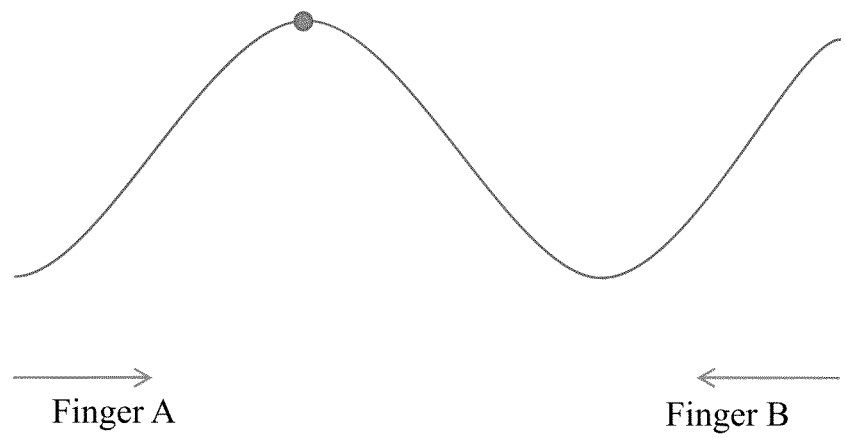
FIG. 8 is a schematic diagram of the playback progress indicating line after adjustment is performed through a first touch control operation in the embodiment of the present application.
Figure 9:
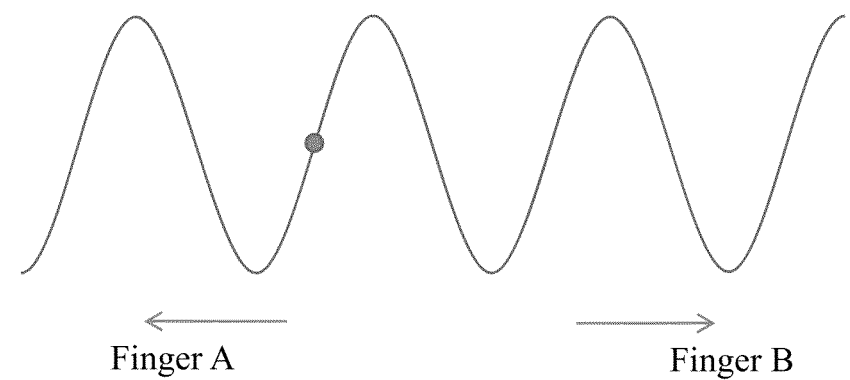
FIG. 9 is a schematic diagram of the playback progress indicating line after adjustment is performed once again through the first touch control operation based on FIG. 8 in the embodiment of the present application.

In this embodiment, based on the user's customary operation mode, the template operation may be set as a first operation that two fingers spaced a certain distance slide toward a single center (as shown in FIG. 7, wherein the straight line is an abstracted playback progress indicating line on the progress bar, display strips with arrows indicate the sliding directions of the fingers A and B) and a second operation that slides to opposite directions, since the sliding direction of the second operation is converse to that of the first operation, the function correspondingly achieved is not the same (the playback progress indicating line after accuracy is increased may be correspondingly adjusted to a shorter line, such as adjusting from a line pattern shown in FIG. 9 to that shown in FIG. 8). If the two touch control points draw together to the middle based on the progress bar shown in FIG. 7, then a curve shown in FIG. 8 is formed correspondingly. Length of the curve shown in FIG. 8 is obviously larger than that of the straight line shown in FIG. 7, if the straight line shown in FIG. 7 and the curve shown in FIG. 8 are used to correspond to play time of the same data contents, then when the user uses the curve shown in FIG. 8 to correspond to the play time, a segment to which each scale of the play time corresponds will be longer.

Based on the above characteristic when the user performs the touch operation, whether the first operation information satisfies the first preset condition can be judged by detecting whether the user performs a two-finger sliding operation, thus the embodiment of the present application selects the most simple way of judgment: determining whether touch control point of the touch control operation performed by the user is two; thereafter in view of the judgment on the sliding track of the user, further defecting whether the relative distance between the two touch control points changes, if it changes, it can be determined that the sliding operation of the user is sliding toward a single center or sliding in opposite directions.

In the solution provided in the embodiment of the present application, whether the first touch control operation performed by the user satisfies the preset condition can be determined through any one of the above two manners, or the first touch control operation performed by the user may also be judged through a combination of the two combined in a certain way.

Figure 10:
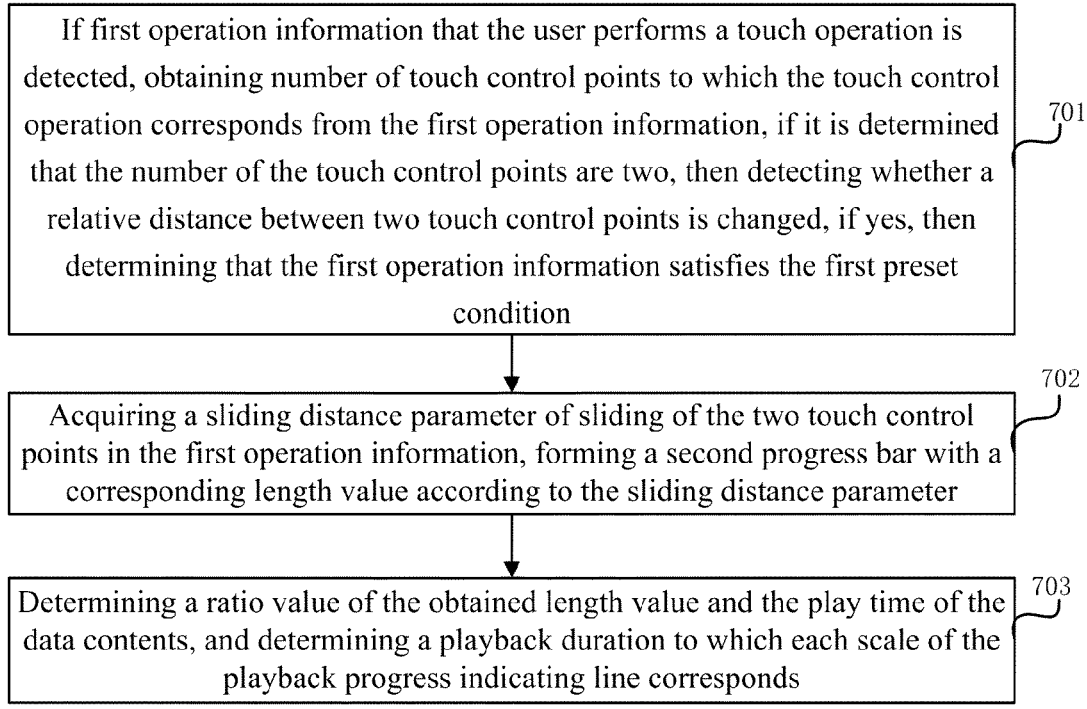
FIG. 10 is a schematic diagram of the method of judging whether the first operation satisfies a first preset condition in the embodiment of the present application.

As shown in FIG. 10, a first embodiment, if the user judges whether the first operation performed by the user satisfies the first preset condition through the number of the touch control point, the method provided by the embodiment of the present application specifically comprises step 701, if first operation information that the user performs a touch operation is detected, obtaining number of touch control points to which the touch control operation corresponds from the first operation information, if it is determined that the number of the touch control points are two, then detecting whether a relative distance between two touch control points is changed, if yes, then determining that the first operation information satisfies the first preset condition; step 702, acquiring a sliding distance parameter of sliding of the two touch control points in the first operation information, forming a second progress bar with a corresponding length value according to the sliding distance parameter.

In this embodiment, the sliding distance parameter includes various types, which may be rapidness of the finger sliding, the sliding distance value, and the sliding direction etc.

Because in the embodiment of present application, the distance value of finger sliding is selected as the optimized implementation to implement obtaining a playback progress indicating line with a corresponding length value, the specific implementation steps are obtaining a distance value between the two touch control points at a first moment and a second moment when the user performs the touch control operation, the second moment being subsequent to the first moment; and comparing a first distance value between the two touch control points at the first moment with a second distance value between the two touch control points at the second moment, and forming a second progress indicating line with a second length value according to the comparison result.

In this embodiment, only when length of adjusted playback progress indicating line (i.e., the second progress bar) is determined, the correspondence relationship between each scale in the playback progress indicating line and the play time of the data contents can be determined correspondingly. And different users or the same user at different times may also have different requirements on the adjustment accuracy, thus in this embodiment, how long a playback progress indicating line is to be acquired needs to be determined according to the sliding distance of the user, the specific implementing modes may be storing a plurality of playback progress indicating lines with different lengths in advance in the electronic device; thereafter determining a first distance value between the two touch control points at a first moment and a second distance value between the two touch control points at a second moment, and subtracting the second value from the first user to obtain a sliding distance value that is slid when the user performs a first touch control operation; obtaining a length value of the progress bar displayed on the touch control display unit, and obtaining a first ratio by dividing the sliding distance value by the length value of the progress bar; and according to the correspondence relationship between the preset first ratio and the stored playback progress indicating line, determining a second progress bar to which the first touch operation corresponds.

A first example, a plurality of second progress bars with different lengths stored in the system respectively are 15 cm (corresponding to a ratio of 0 to 1/3), 20 cm (corresponding to a ratio of 1/3 to 2/3), and 25 cm (corresponding to a ratio of 2/3 to 1). The progress bar displayed in the touch control display unit is 10 cm, when the user performs the first touch control operation, the distance value at the second moment relative to the first moment is 3 cm, and the corresponding calculated first ratio is 3/10. Because 3/10 is in the range of 0 to 1/3 range, so the second progress bar with a length of 15 cm is selected correspondingly.

Step 703, determining a ratio value of the obtained length value and the play time of the data contents, and determining a playback duration to which each scale of the playback progress indicating line corresponds.

Because length of the progress bar is changed, correspondingly, correspondence relationship between the progress bar and the play time of the data contents is changed, which thereby make adjustment accuracy of the progress bar change correspondingly.

Since the play time of the entire data contents is constant, after determining the length of playback progress indicating line, then adjustment accuracy of the progress bar after the adjustment can be obtained correspondingly by dividing the play time by the length of the playback progress indicating line.

If the entire data contents have a playback duration of 60 minutes, such as the example shown in FIG. 1, then in the original case, adjustment accuracy of the progress bar is 60/10, that is, when the progress bar is adjusted 1 cm, playing of the data contents will be adjusted 6 minutes forward or rewind; according to the adjusted playback progress indicating line, adjustment accuracy of the progress bar is 60/15, that is, when the progress bar is adjusted 1 cm, playing of the data contents will be adjusted 4 minutes forward or rewind. In the above distance, the playback progress indicating line is not adjusted too largely, so accuracy before and after adjustment has not changed so much, if the user needs more higher accuracy, he/she can adjust the playback progress indicating line to a longer line segment.

In the embodiment of the present application, the adjusted progress bar may be displayed in two manners, wherein the specific manners are displaying in form of a curve or displaying in form of a straight line, the specific implementations are:

First, because the conventional playback progress indicating line on the progress bar is a straight line, if it becomes a curve, in the case that size of the screen is given (i.e., regardless of playback progress indicating line on the progress bar is adjusted to a straight line or a curve, two endpoints of the indicating lines are at the same position), if the playback progress indicating line is adjusted to a curve, since length of the curve is obviously larger than that of the straight line, so the correspondence relationship between the play time of the data contents and the progress bar will change. Therefore, the progress bar in the embodiment of the present application may be reflected in form of a curve. When the progress bar is reflected through the curve, in order to facilitate using of the user, correspondingly, during the using of the user, if the sliding track is approximately parallel to the progress bar, then two fingers slide toward the center to narrow a distance between the two touch control points, it should be needing to increase the adjustment accuracy; if the two fingers slid oppositely, it might be stretching the curve, so as to decrease the adjustment accuracy. In view of the above case, a second progress bar with a second length value is formed according to the comparison result in the embodiment of the present application, which comprises at least two ways:

(1) When the track formed by sliding of the touch control points is approximately parallel to the straight line formed by the progress bar, that is, a first angle value between a track formed by sliding of the touch control points and a displayed progress bar is smaller than a predetermined threshold value.

Determining a first angle value between a track formed by sliding of the touch control points and a displayed progress bar, if the first angle value is smaller than a predetermined threshold value, and the comparison result is that the first distance value is larger than the second distance value, then determining that the second playback duration is smaller than the first playback duration (the first length value of the progress bar at the first moment is smaller than the second length value of the progress bar at the second moment, it is adjusted to the line with a length as shown in FIG. 8 from that as shown in FIG. 7); when the comparison result is that the first distance value is not larger than the second distance value, then determining that the second playback duration is larger than the first playback duration (the first length value of the progress bar at the first moment is larger than the second length value of the progress bar at the second moment, it is adjusted to the line with a length as shown in FIG. 8 from that as shown in FIG. 9).

It is impossible that track of the sliding is a straight line that is absolutely parallel, and also it cannot guaranteed that the stored track is absolutely parallel to the progress bar, so in order to make an judgment more reasonably, it needs to consider that when the angle between the sliding track and the progress bar is within a certain range, it can be determined that the sliding track is parallel to the progress bar. The range may be a range of values of 0 to 30 degrees.

(2) When the track formed by sliding of the touch control point is approximately perpendicular to the straight line formed by the progress bar, that is, the first angle value between the sliding track and the displayed progress bar is larger than the predetermined threshold value but smaller than 90 degrees.

Figure 11:
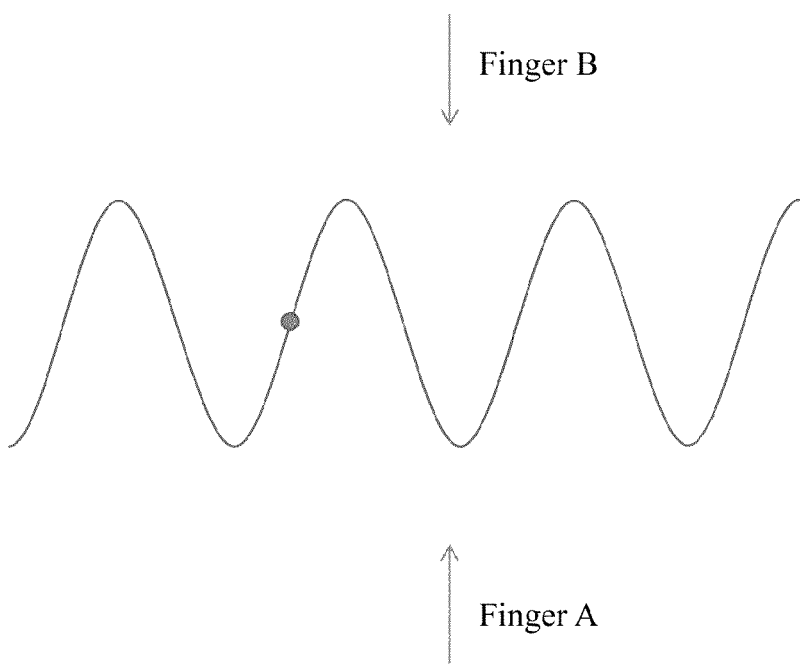
FIG. 11 and FIG. 12 are schematic diagrams of adjusting the progress bar in a vertically sliding manner in the embodiment of the present application.
Figure 12:
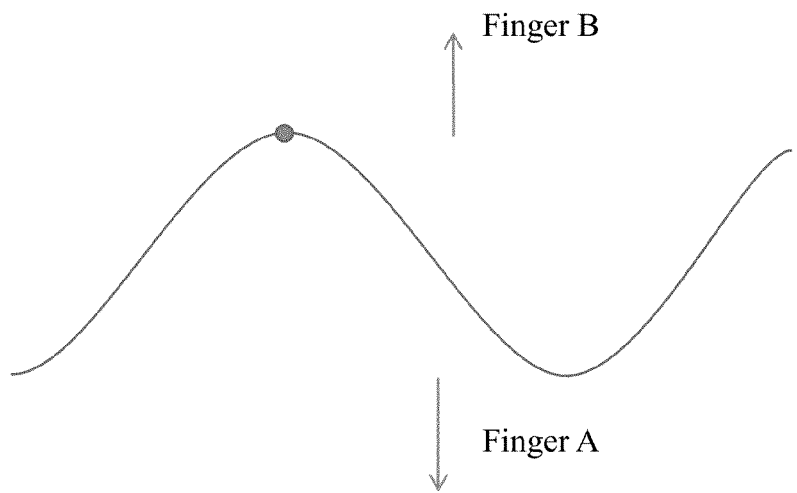

If the first angle value is larger than the predetermined threshold value, and the comparison result is that the first distance value is larger than the second distance value, then determining that the second playback duration is larger than the first playback duration (the first length value of the progress bar at the first moment is smaller than the second length value of the progress bar at the second moment, it is adjusted to the line with a length as shown in FIG. 12 from that as shown in FIG. 11); and when the comparison result is that the first distance value is not larger than the second distance value, then determining that the second playback duration is smaller than the first playback duration (the first length value of the progress bar at the first moment is larger than the second length value of the progress bar at the second moment, it is adjusted to the line with a length as shown in FIG. 11 from that as shown in FIG. 12).

Figure 13:
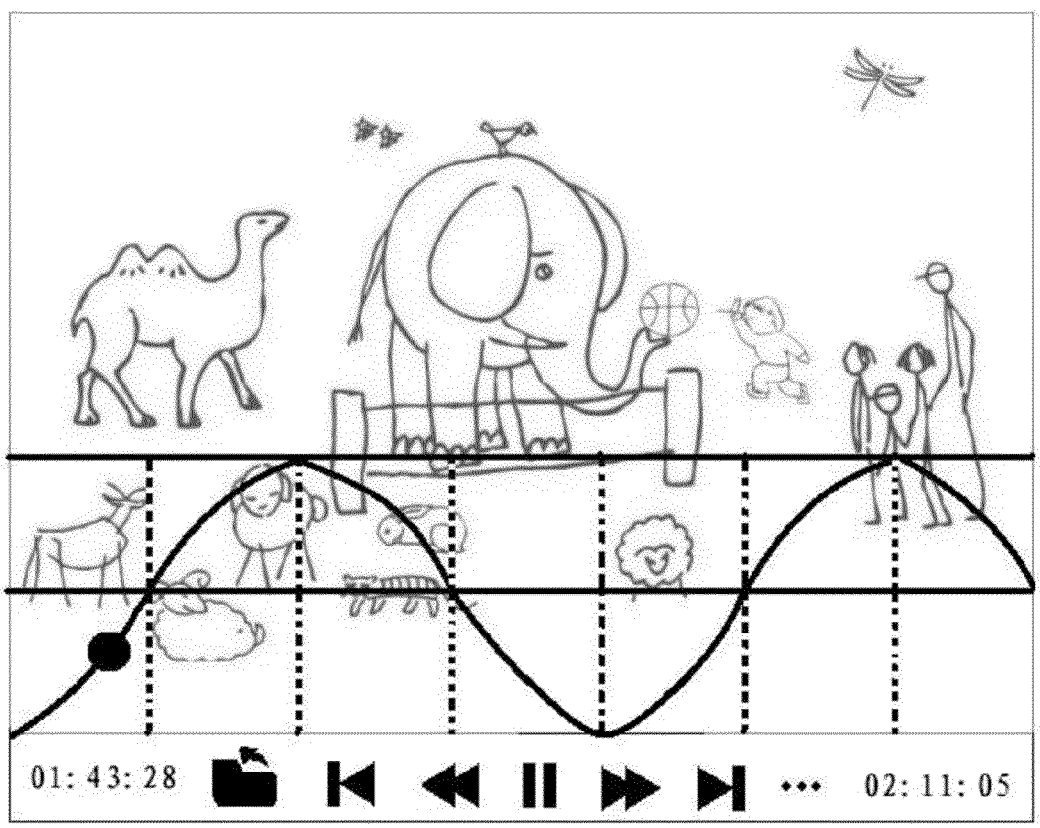
FIG. 13 is a schematic diagram of displaying the progress bar on the display unit by means of a transparent interface in the embodiment of the present application.

In this embodiment, in order to facilitate the user performing adjustment, when the playback progress indicating line is displayed through a curve, also the display area of the entire progress bar may be extended, the extended progress bar may be displayed in a transparent manner (as shown in FIG. 13) to avoid the extended progress bar affecting viewing of the user on the displayed contents.

Second, the adjusted playback progress indicating line is displayed in manner of a straight line, then the display manner of a second progress bar with a second length value obtained according to the comparison result may be when the comparison result is that the first distance value is larger than the second distance value, then determining that the second playback duration is larger than the first playback duration; and when the comparison result is that the first distance value is not larger than the second distance value, then determining that the second playback duration is smaller than the first playback duration.

Figure 14:
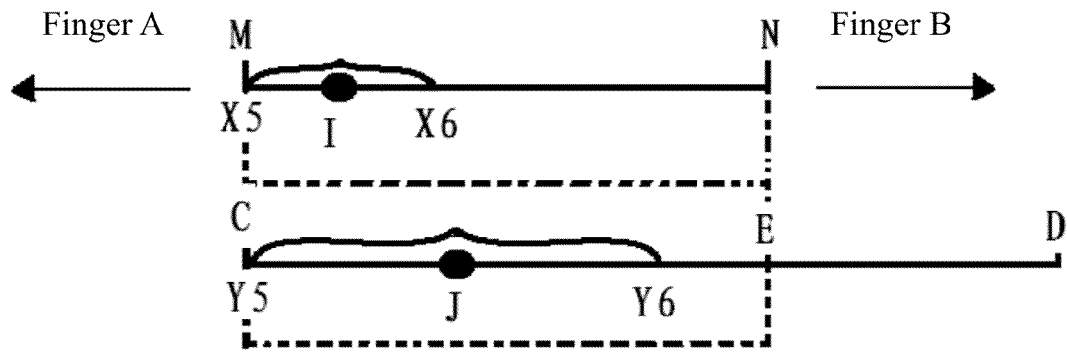
FIG. 14 is a schematic diagram of adjustment of the playback progress indicating line when the progress indicating lines before and after adjustment both are straight lines in the embodiment of the present application.

As shown in FIG. 14, when fingers A and B (i.e., two touch control points) slide in the two directions of left and right as shown therein, the corresponding purpose is to extend the playback progress indicating line on the progress bar. In this figure, if the first progress bar is extended from a segment MN to a segment CD, adjustment accuracy of the adjusted progress bar is also adjusted to a ratio of the segment CD to the play time of the multimedia play file.

Figure 15:
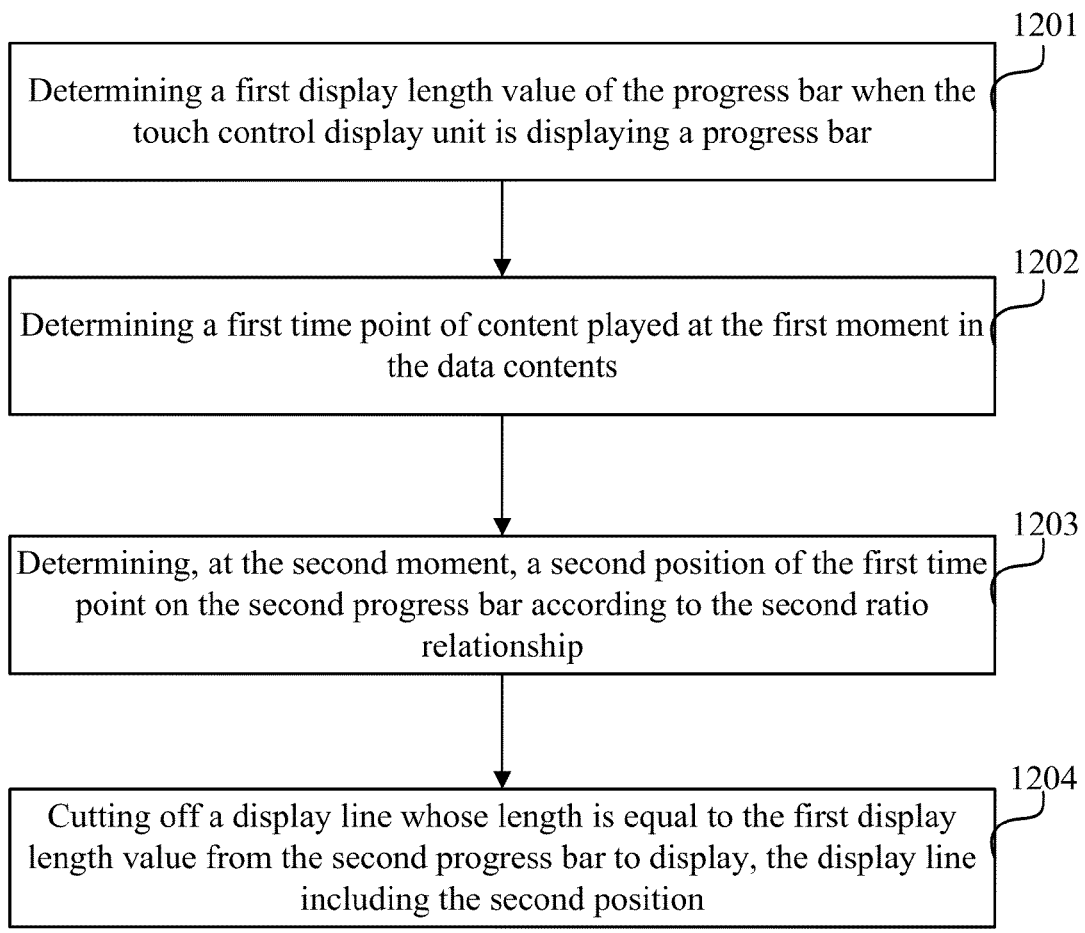
FIG. 15 is a process flowchart of displaying the adjusted playback progress indicating line in the embodiment of the present application.

In this instance, in order to not change the display interface of the original progress bar, when displaying the adjusted playback progress indicating line (the second progress bar), a segment on the playback progress indicating line may be cut off to display, thus displaying the second progress bar comprises (as shown in FIG. 15) step 1201, determining a first display length value of the progress bar when the touch control display unit is displaying a progress bar; firstly, detecting a first display length value of the progress bar, i.e. the length of the segment MN in FIG. 14; step 1202, determining a first time point of content played at the first moment in the data contents (as shown in FIG. 14, position of playing of the data contents is point I); step 1203, determining. at the second moment, a second position of the first time point on the second progress bar (segment CD) according to the second ratio relationship (as shown in FIG. 14, position of playing of the data contents is point J); and step 1204, cutting off a display line whose length is equal to the first display length value from the second progress bar to display, the display line including the second position.

In order to still ensure continuity of the user's adjustment after the system adjusts the progress bar, position that is being currently played needs to be displayed on the playback progress indicating line that is cut off. As shown in FIG. 14, if the progress bar of the current display interface is incapable of accommodating the playback progress indicating line, a segment with a length of MN is cut off at a position to which the content being currently played corresponds, as the current playback progress indicating line of the progress bar to display (segment CE in FIG. 14).

As shown in FIG. 14, when the method provided by the embodiment of the present application is used to extend the playback progress indicating line, the play time of the segment X5X6 before adjustment corresponds to the adjusted segment Y5Y6, according to the illustration of the figure, it can be determined that length of the adjusted segment Y5Y6 is obviously longer than that of the segment X5X6.

The method provided by the embodiment of the present application can perform adjustment in the process of playing the data contents, thus the adjustment manner of the played contents may comprise two implementation manners:

(1) Content that is being currently displayed on the display unit is correspondingly adjusted while adjusting accuracy of the progress bar, the specific implementation steps comprise when the sensing unit detects the input operation, determining a first position of a first play time point to which content being displayed currently corresponds on the first progress bar, and determining a third distance value between the first position and a start point of the first progress bar; then after obtaining the second progress bar with a second progress bar, determining a third position on the second progress bar according to the third distance value; in a specific implementation, the start points of the first progress bar and the second progress bar are aligned, and thereafter position of the third distance value on the second progress bar is determined; and determining a second play time point of the data content to which the third position corresponds according to the second ratio relationship, switching to the second time point to play.

(2) After determining accuracy of the progress bar, by means of recording the time point before the progress adjustment, after the accuracy adjustment, playing is continued from the time before the progress adjustment, if needs to perform play time adjustment, a small slipper on the progress bar is dragged additionally to perform the corresponding adjustment on displayed contents, the specific implementation steps are when the sensing unit detects an input operation, determining a first play time point to which content being currently displayed corresponds; and then after obtaining the second progress bar with the second length value, determining position of the first play time point on the second progress bar according to the second ratio relationship, and correspondingly displaying the position of the first play time point on the progress bar.

The method provided by the present application can directly adjust a ratio relationship between a progress indicating lines displayed on a touch control bar and play time of the data contents by means of a preset touch control operation. If a user needs to improve accuracy of the progress adjustment, he/she can directly extend the playback progress indicating line, after the playback progress indicating line is extended, play time to which each scale corresponds is shortened, then the user can adjust to a position where he/she wants to watch more accurately and easily when using the extended playback progress indicating line. And accuracy, which is several times that of the conventional progress bar, can be reached easily. Because the correspondence relationship between the progress bar and play time provided by the present application is adjustable, the user can arbitrarily adjust accuracy of the progress bar according to his/her own requirements on accuracy, and the adjustment operation in the present application only requires the user to input a touch control operation that satisfies a preset condition, the operation procedure is simple and natural.

Figure 16:
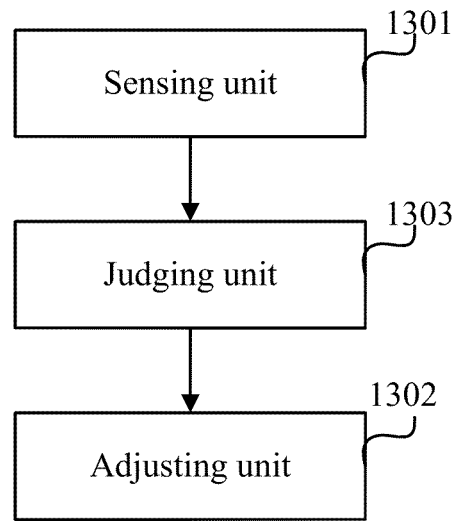
FIG. 16 is a structural schematic diagram of an electronic device in an embodiment of the present application.

As shown in FIG. 16, according to the above method, the present application also provides an electronic device including a sensing unit 1301 and a display unit on which, when data contents are displayed, a first progress bar corresponding to the data contents and with a first length value is displayed, wherein the sensing unit detects an input operation, the device further comprising an adjusting unit 1302 for, in response to the input operation, controlling the first progress bar to form a second progress bar, wherein a first playback duration of the data contents to which a unit length of the first progress bar corresponds is not equal to a second playback duration of the data contents to which a unit length of the second progress bar corresponds.

In the embodiment of the present application, in order to further determine whether the detected input operation is an operation to adjust accuracy of the progress bar, the input operation needs to be judged, the electronic device further comprises a judging unit 1303 for obtaining first operation information to which the input operation corresponds, and judging whether the first operation information satisfies a first preset condition, so as to obtain a first judgment result; and when the first judgment result indicates that the first operation information satisfies the first preset condition, then it is shifted to the adjusting unit.

Figure 17:
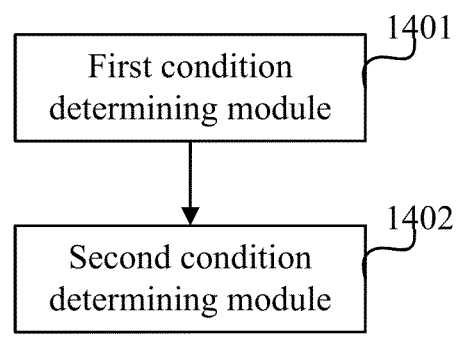
FIG. 17 is a structural schematic diagram of a determining unit in the embodiment of the present application.

As shown in FIG. 17, in the embodiment of the present application, the implementation for determining whether the first operation information input by the user is to trigger the electronic device to perform accuracy adjustment may include a variety, the embodiment of the present application provides two optimized implementation solutions below, thus, when the sensing unit is a touch control unit, the judging unit 1303 comprises a first condition determining module 1401 for determining an operation area to which the touch control operation corresponds according to the first operation information, determining whether coordinates of the operation area are within a display area to which the progress bar corresponds, if yes, then determining that the first operation information satisfies the first preset condition; and a second condition determining module 1402 for obtaining number of touch control points to which the touch control operation corresponds from the first operation information, if it is determined that the number of the touch control points are two, then detecting whether a relative distance between two touch control points is changed, if yes, then determining that the first operation information satisfies the first preset condition.

In the solution provided in the embodiment of the present application, whether the first touch control operation performed by the user satisfies the preset condition can be determined through any one of the above two manners, or the first touch control operation performed by the user may also be judged through a combination of the two combined in a certain way.

The adjusting unit 1302 is further for acquiring a sliding distance parameter of sliding of the two touch control points in the first operation information, forming a second progress bar with a corresponding length value according to the sliding distance parameter.

Because in the embodiment of present application, the distance value of finger sliding is selected as the optimized implementation to implement obtaining an indicating line with a corresponding length value of the playback progress, the specific implementation steps are the adjusting unit is further for obtaining a distance value between the two touch control points at a first moment and a second moment when the user performs the touch control operation, the second moment being subsequent to the first moment; and comparing a first distance value between the two touch control points at the first moment with a second distance value between the two touch control points at the second moment, and forming the second progress bar with the second length value according to the comparison result.

One or more technical solutions of embodiments of the present application described above have at least the following technical effects:

The method provided by the present application can directly adjust a ratio relationship between a progress indicating lines displayed on a touch control bar and play time of the data contents by means of a preset touch control operation. If a user needs to improve accuracy of the progress adjustment, he/she can directly extend the playback progress indicating line, after the playback progress indicating line is extended, play time to which each scale corresponds is shortened, then the user can adjust to a position where he/she wants to watch more accurately and easily when using the extended playback progress indicating line. And accuracy, which is several times that of the conventional progress bar, can be reached easily. Because the correspondence relationship between the progress bar and play time provided by the present application is adjustable, the user can arbitrarily adjust accuracy of the progress bar according to his/her own requirements on accuracy, and the adjustment operation in the present application only requires the user to input a touch control operation that satisfies a preset condition, the operation procedure is simple and natural.

In addition, since the solution provided by the present application does not need to add extra controls, not only a very fine control granularity is ensured, but also an approximate position where a current process locates can be reflected very intuitively.

Although preferred embodiments of the present application are already described, once a person skilled in the art learns the basic inventive concepts, he/she can make additional changes and modifications to these embodiments. Therefore, the appended claims are intended to be construed as including these preferred embodiments as well as all changes and modifications within the scope of the present application.

Obviously, a person skilled in the art can make various modifications and variations to the present application without departing from the spirit and scope of the present application. Thus, if these modifications and variations to the present application are within the scope of the claims and technical equivalents of the present application, the present application is also intended to include these modifications and variations.

What is claimed is:

1. A progress adjustment method applied to an electronic device including a display unit on which data contents corresponding to first data are output in a chronological order, the method comprising:
displaying a progress bar corresponding to the first data on the display unit, the progress bar having a length approximately the same as a first side of the display unit, and unit progress of the progress bar being a first unit progress;
when obtaining a first input operation, controlling switching of the data contents of the first data with the first unit progress according to the first input operation;
obtaining a second sliding operation; and
generating a first sub progress bar based on a current progress unit that includes a progress identifier on the progress bar according to the second sliding operation; unit progress of the first sub progress bar being a second unit progress; the second unit progress being smaller than the first unit progress, so that when the electronic device obtains a second input operation on the first sub progress bar, switching of the data contents of the first data is executed with the second unit progress.

2. The method of claim 1, wherein obtaining a first input operation specifically is:
obtaining a first sliding operation that slides along direction of the progress bar.

3. The method of claim 2, wherein after obtaining a first sliding operation that slides along direction of the progress bar, the method further comprises:
controlling position of the progress identifier on the progress bar according to the first sliding operation.

4. The method of claim 3, wherein obtaining a second sliding operation specifically is:
obtaining a second sliding operation that slides in a direction approximately perpendicular to the progress bar.

5. The method of claim 4, wherein after generating a first sub progress bar based on a current progress unit that includes a progress identifier on the progress bar according to the second sliding operation, the method further comprises:
displaying the first sub progress bar that includes the progress identifier according to the second sliding operation.

6. The method of claim 5, wherein displaying the first sub progress bar that includes the progress identifier according to the second sliding operation specifically is:
determining, on the progress bar, the current progress unit that includes the progress identifier on the progress bar as a first display length; and
geometrically stretching the first display length of the current progress unit according to the sliding direction of the second sliding operation, so as to form the first sub progress bar with a second display length, wherein the second display length and the second unit progress satisfy a correspondence relationship so as to make the progress bar change to a third display length, and the third display length is larger than the first side.

7. The method of claim 6, wherein when the second input operation specifically is a third sliding operation that slides along the direction of the first sub progress bar on the first sub progress bar, after geometrically stretching the first display length of the current progress unit according to the sliding direction of the second sliding operation, so as to form the first sub progress bar with a second display length, the method further comprises:
controlling position of the progress identifier on the first sub progress bar according to the third sliding operation.

8. The method of claim 7, wherein after controlling position of the progress identifier on the first sub progress bar according to the third sliding operation, the method further comprises:
detecting whether the third sliding operation ends, so to obtain a detection result; and when the detection result indicates that the third sliding operation ends, controlling the first sub progress bar to gradually reduce to the first display length from the second display length, so as to make the progress bar restore to be approximately the same as the first side from the third display length.

9. An electronic device including a display unit, further comprising:
a first output unit for outputting data contents corresponding to first data in a chronological order on the display unit, and displaying a progress bar corresponding to the first data on the display unit, the progress bar having a length approximately the same as a first side of the display unit, and unit progress of the progress bar being a first unit progress;
a first control unit for, when obtaining a first input operation, controlling switching of the data contents of the first data with the first unit progress according to the first input operation;
an obtaining unit for obtaining a second sliding operation; and
a generating unit for generating a first sub progress bar based on a current progress unit that includes a progress identifier on the progress bar according to the second sliding operation; unit progress of the first sub progress bar being a second unit progress; the second unit progress being smaller than the first unit progress, so that when the electronic device obtains a second input operation on the first sub progress bar, switching of the data contents of the first data is executed with the second unit progress.

10. The electronic device of claim 9, wherein the first control unit specifically comprises:
an obtaining subunit for obtaining a first sliding operation that slides along direction of the progress bar.

11. The electronic device of claim 10, further comprising:
a second control unit for controlling position of the progress identifier on the progress bar according to the first sliding operation.

12. The electronic device of claim 11, wherein the obtaining unit specifically is:
a sliding operation obtaining subunit for obtaining a second sliding operation that slides in a direction approximately perpendicular to the progress bar.

13. The electronic device of claim 12, further comprising:
a second output unit for displaying the first sub progress bar that includes the progress identifier according to the second sliding operation.

14. The electronic device of claim 13, wherein the second output unit further comprising:
a determining subunit for determining, on the progress bar, the current progress unit that includes the progress identifier on the progress bar as a first display length; and
a forming subunit for geometrically stretching the first display length of the current progress unit according to the sliding direction of the second sliding operation, so as to form the first sub progress bar with a second display length, wherein the second display length and the second unit progress satisfy a correspondence relationship so as to make the progress bar change to a third display length, and the third display length is larger than the first side.

15. The electronic device of claim 14, wherein when the second input operation specifically is a third sliding operation that slides along the direction of the first sub progress bar on the first sub progress bar, the electronic device further comprises:

a third control unit for controlling position of the progress identifier on the first sub progress bar according to the third sliding operation.

16. The electronic device of claim 15, further comprising:
a detecting unit for detecting whether the third sliding operation ends, so to obtain a detection result; and
a third controlling unit for, when the detection result indicates that the third sliding operation ends, controlling the first sub progress bar to gradually reduce to the first display length from the second display length, so as to make the progress bar restore to be approximately the same as the first side from the third display length.

17. A progress adjustment method applied to an electronic device including a sensing unit and a display unit on which, when data contents are displayed, a first progress bar corresponding to the data contents and with a first length value is displayed, the method comprising:
detecting an input operation by the sensing unit; and
in response to the input operation, controlling the first progress bar to form a second progress bar, wherein a first playback duration of the data contents to which a unit length of the first progress bar corresponds is not equal to a second playback duration of the data contents to which a unit length of the second progress bar corresponds.

18. The method of claim 17, wherein before, in response to the input operation, controlling the first progress bar to form a second progress bar, the method further comprises:
obtaining first operation information to which the input operation corresponds, and judging whether the first operation information satisfies a first preset condition, so as to obtain a first judgment result; and
if the first judgment result indicates that the first operation information satisfies the first preset condition, then controlling the first progress bar to form a second progress bar.

19. The method of claim 18, wherein when the sensing unit is a touch control unit, then judging whether the first operation information satisfies a first preset condition comprises:
determining an operation area to which a touch control operation corresponds according to the first operation information, determining whether coordinates of the operation area are within a display area to which the progress bar corresponds, if yes, then determining that the first operation information satisfies the first preset condition.

20. The method of claim 18, wherein when the sensing unit is a touch control unit, then judging whether the first operation information satisfies a first preset condition comprises:
obtaining number of touch control points to which the touch control operation corresponds from the first operation information, if it is determined that the number of the touch control points are two, then detecting whether a relative distance between two touch control points is changed, if yes, then determining that the first operation information satisfies the first preset condition.

21. The method of claim 19, wherein controlling the first progress bar to form a second progress bar comprises:
acquiring a sliding distance parameter of sliding of the two touch control points in the first operation information, forming a second progress bar with a corresponding length value according to the sliding distance parameter.

22. The method of claim 21, wherein forming a second progress bar with a corresponding length value according to the sliding distance parameter comprises:
obtaining a distance value between the two touch control points at a first moment and a second moment when the user performs the touch control operation, the second moment being subsequent to the first moment; and comparing a first distance value between the two touch control points at the first moment with a second distance value between the two touch control points at the second moment, and forming a second progress bar with a second length value according to the comparison result.

23. The method of claim 22, wherein when the second progress bar is displayed in form of a curve, forming a second progress bar with a second length value according to the comparison result comprises:

determining a first angle value between a track formed by sliding of the touch control points and a displayed progress bar, if the first angle value is smaller than a predetermined threshold value, and the comparison result is that the first distance value is larger than the second distance value, then determining that the second playback duration is smaller than the first playback duration; when the comparison result is that the first distance value is not larger than the second distance value, then determining that the second playback duration is larger than the first playback duration; and if the first angle value is larger than the predetermined threshold value, and the comparison result is that the first distance value is larger than the second distance value, then determining that the second playback duration is larger than the first playback duration; and when the comparison result is that the first distance value is not larger than the second distance value, then determining that the second playback duration is smaller than the first playback duration.

24. The method of claim 22, wherein when the first progress bar is displayed in form of a straight line, forming a second progress bar with a second length value according to the comparison result comprises:

when the comparison result is that the first distance value is larger than the second distance value, then determining that the second playback duration is larger than the first playback duration; and when the comparison result is that the first distance value is not larger than the second distance value, then determining that the second playback duration is smaller than the first playback duration.

25. The method of claim 24, wherein displaying the second progress bar comprises:

determining a first display length value of the progress bar when the touch control display unit is displaying a progress bar;

determining a first time point of content played at the first moment in the data contents;

determining, at the second moment, a second position of the first time point on a first playback progress indicating line according to the first ratio relationship; and cutting off a display line whose length is equal to the first display length value from the second progress bar to display, the display line including the second position.

26. The method of claim 18, further comprising:

when the sensing unit detects the input operation, determining a first position of a first play time point to which content being displayed currently corresponds on the first progress bar, and determining a third distance value between the first position and a start point of the first progress bar;

then after obtaining the second progress bar with a second progress bar, determining a third position on the second progress bar according to the third distance value; and determining a second play time point of the data content to which the third position corresponds according to the second ratio relationship, switching to the second time point to play.

27. The method of claim 18, further comprising:

when the sensing unit detects an input operation, determining a first play time point to which content being currently displayed corresponds; and then after obtaining the second progress bar with the second length value, determining position of the first play time point on the second progress bar according to the second ratio relationship, and correspondingly displaying the position of the first play time point on the progress bar.

28. An electronic device including a sensing unit and a display unit on which, when data contents are displayed, a first progress bar corresponding to the data contents and with a first length value is displayed, wherein the sensing unit detects an input operation, the device further comprising:

an adjusting unit for, in response to the input operation, controlling the first progress bar to form a second progress bar, wherein a first playback duration of the data contents to which a unit length of the first progress bar corresponds is not equal to a second playback duration of the data contents to which a unit length of the second progress bar corresponds.

29. The electronic device of claim 18, further comprising:

a judging unit for obtaining first operation information to which the input operation corresponds, and judging whether the first operation information satisfies a first preset condition, so as to obtain a first judgment result; and when the first judgment result indicates that the first operation information satisfies the first preset condition, then it is shifted to the adjusting unit.

30. The method of claim 28, wherein when the sensing unit is a touch control unit, the judging unit comprises:

a first condition determining module for determining an operation area to which the touch control operation corresponds according to the first operation information, determining whether coordinates of the operation area are within a display area to which the progress bar corresponds, if yes, then determining that the first operation information satisfies the first preset condition; and a second condition determining module for obtaining number of touch control points to which the touch control operation corresponds from the first operation information, if it is determined that the number of the touch control points are two, then detecting whether a relative distance between two touch control points is changed, if yes, then determining that the first operation information satisfies the first preset condition.

31. The device of claim 29, wherein the adjusting unit is further for acquiring a sliding distance parameter of sliding of the two touch control points in the first operation information, forming a second progress bar with a corresponding length value according to the sliding distance parameter.

32. The device of claim 31, wherein the adjusting unit is further for obtaining a distance value between the two touch control points at a first moment and a second moment when the user performs the touch control operation, the second moment being subsequent to the first moment; and comparing a first distance value between the two touch control points at the first moment with a second distance value between the two touch control points at the second moment, and forming the second progress bar with the second length value according to the comparison result.

* * * * *